E. K. BAKER.
CONVERTIBLE PNEUMATIC TIRE RIM.
APPLICATION FILED JULY 27, 1906.

899,856.

Patented Sept. 29, 1908.

Witnesses:
A. W. Nelson
M. Simon

Inventor:
Erle K. Baker

UNITED STATES PATENT OFFICE.

ERLE K. BAKER, OF CHICAGO, ILLINOIS, ASSIGNOR OF ONE-HALF TO CHARLES GILBERT HAWLEY, OF CHICAGO, ILLINOIS.

CONVERTIBLE PNEUMATIC-TIRE RIM.

No. 899,856.　　　　Specification of Letters Patent.　　Patented Sept. 29, 1908.

Application filed July 27, 1906. Serial No. 328,052.

*To all whom it may concern:*

Be it known that I, ERLE K. BAKER, a citizen of the United States, and a resident of Chicago, Cook county, Illinois, have invented certain new and useful Improvements in Convertible Pneumatic-Tire Rims, of which the following is a full, clear, and exact description, such as will enable others skilled in the art to which it appertains to make and use the same.

My invention relates to improvements in wheel rims and has special reference to rims for wheels having pneumatic or cushion tires.

The object of my invention is to provide a wheel rim that shall be composed of several parts capable of ready manipulation and which shall adapt the rim to any of several kinds of tires that are now in general use.

Another object of the invention is to provide a wheel rim that shall be convertible and which shall also facilitate the placing and removal of the tire.

With these objects in view, my invention consists generally in a wheel rim provided with clencher flanges, in combination with a filler ring or rings which may be placed in and upon the rim to adapt the same for use with a non-clencher tire. And further my invention consists in a wheel rim having curled or clencher flanges, one or both of which are detachable from the rim proper, in combination with a filler ring or rings of different cross-section, which, being placed upon said rim, serve as the flanges for non-clencher tires. And further, my invention consists in various details of construction and in combinations of parts, all as hereinafter described and particularly pointed out in the claims.

Figure 1:
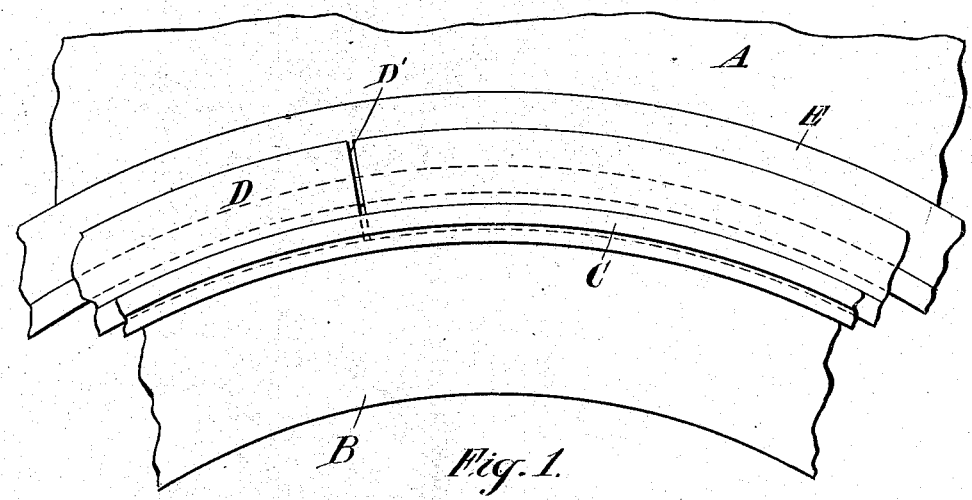
Figure 2:
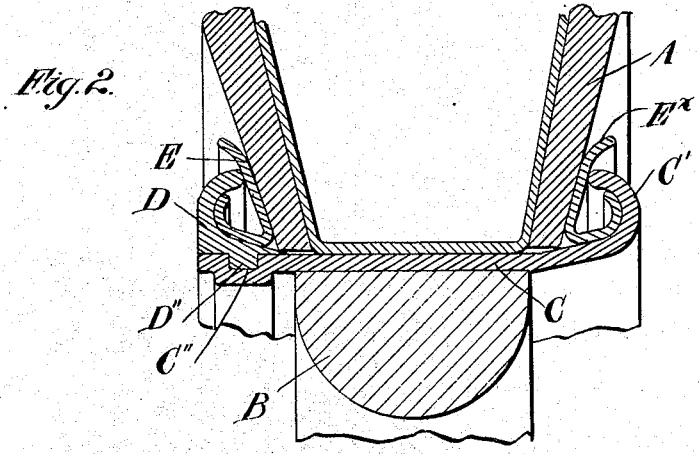
Figure 3:
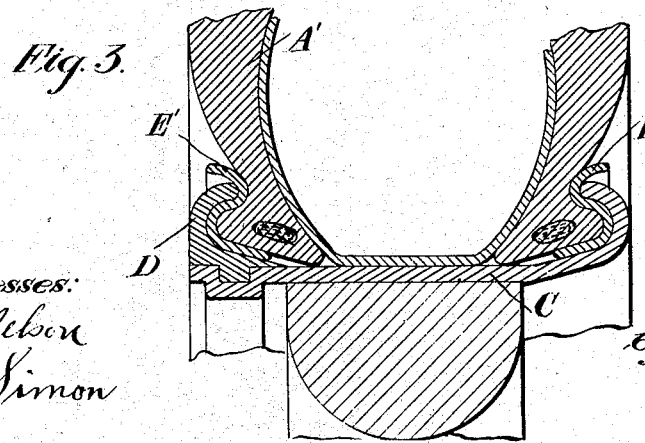

The invention will be more readily understood by reference to the accompanying drawings forming a part of this specification, and in which Figure 1 is a partial side elevation of an automobile wheel rim embodying my invention; Fig. 2 is an enlarged cross-section thereof; and Fig. 3 illustrates filler rings of a modified form.

As shown in the drawings, B, represents a wheel felly and C a wheel rim. At one edge the rim is provided with a so-called clencher flange, C', which is integral with the body of the rim, at the other edge the rim is provided with a groove, C''. The complementary clencher flange is in the form of a split ring, D, open at one point D', as shown in Fig. 1. This ring is provided with an annular bead or tongue, D'', which fits in the groove, C'' of the flange. The ring, D, is held in place on the flange, the means which I prefer to employ for this purpose being an endless ring which takes one of the two forms, E and E', shown in Figs. 2 and 3, such form depending upon the shape of the tire on which the rim is to be used. The essential point is that at least one flange of the rim is detachable. It is obvious that such detachable flanges may be used upon both sides or edges of the rim. The ring, E' in Fig. 3 serves to secure the detachable flange, D, on the rim as expanded. It also serves another purpose, namely, to-wit: it forms a curl over the edge of the clencher flange ring and protects the tire, A', therefrom, affording a wide curved surface over which the tire may work without danger of being cut by the rim. The ring, E'' may be either endless or split as it fits within the integral flange of the rim. With respect to the tire it serves the same purpose as the ring, E'. It will be noted that the rim shown in Fig. 2 is a clencher rim, whereas the tire A mounted thereon is of the non-clencher type. To adapt the clencher rim to receive such a tire I employ the fillers or filler rings, E, E$^\times$. The ring, E, serves the double purpose of a filler and a lock for the detachable flange, D. As explained it is preferably endless. The ring, E$^\times$, having no locking function is purely a filler which occupies the clencher groove in the rim and provides a substantially straight surface or flange to receive the side of the tire A. The ring, E$^\times$, may be endless or open as desired. The fillers preferably extend above or upon the clenching edges of the rim and protect the sides of the tire therefrom in the same manner and to the same end as explained in connection with Fig. 3. The forms and sizes of the fillers are determined by the forms and sizes of the rims and tires to be used.

As various modifications of the invention will readily suggest themselves to one skilled in the art, I do not confine the invention to the specific structures herein shown and described.

Having thus described my invention, I claim as new and desire to secure by Letters Patent:

1. A clencher rim having a removable flange and a filler ring adapted to fill the space in one of said flanges and extending above or beyond the edge thereof to protect a non-clencher tire from said edge, substantially as described.

2. A clencher rim having a removable flange, in combination with a ring occupying the groove in one of the flanges of the rim and extending over and around the edge of the flange to form a curved seat for a tire when compressed or deflated, substantially as described.

In testimony whereof, I have hereunto set my hand, this 16th day of July, 1906, in the presence of two subscribing witnesses.

ERLE K. BAKER.

Witnesses:
  A. W. NELSON,
  F. G. KNIGHT.